(12) United States Patent
Borland

(10) Patent No.: US 9,211,660 B2
(45) Date of Patent: Dec. 15, 2015

(54) ADJUSTABLE SUPPORT FOR PREFORMED MOLD

(71) Applicant: John Borland, Winnipeg (CA)

(72) Inventor: John Borland, Winnipeg (CA)

( * ) Notice: Subject to any disclaimer, the term of this patent is extended or adjusted under 35 U.S.C. 154(b) by 301 days.

(21) Appl. No.: 13/827,486

(22) Filed: Mar. 14, 2013

(65) Prior Publication Data

US 2014/0178520 A1      Jun. 26, 2014

Related U.S. Application Data

(60) Provisional application No. 61/740,832, filed on Dec. 21, 2012.

(51) Int. Cl.
| B28B 7/00 | (2006.01) |
| B29C 35/04 | (2006.01) |
| B29C 31/00 | (2006.01) |
| B29L 31/30 | (2006.01) |

(52) U.S. Cl.
CPC ............. *B29C 35/04* (2013.01); *B29C 31/006* (2013.01); *B29C 35/041* (2013.01); *B29C 35/045* (2013.01); *B29L 2031/307* (2013.01)

(58) Field of Classification Search
CPC ........ B28B 7/0091; B29C 70/36; B29C 35/04
USPC ........ 425/405.1–405.2, 387.1–389, 453–454; 264/87, 101, 219
See application file for complete search history.

(56) References Cited

U.S. PATENT DOCUMENTS

| 2,513,785 | A | * | 7/1950 | Browne ........................ 264/517 |
| 3,225,461 | A | * | 12/1965 | Snyder ......................... 434/132 |
| 3,238,576 | A | * | 3/1966 | Taccone ........................ 164/180 |
| 3,431,331 | A | * | 3/1969 | Pincus et al. .................. 264/46.4 |
| 3,999,736 | A | | 12/1976 | Theodorsen |
| 4,269,890 | A | * | 5/1981 | Breitling et al. ................ 428/71 |
| 4,931,242 | A | * | 6/1990 | Uchimura et al. .............. 264/87 |
| 5,176,777 | A | * | 1/1993 | Guilhem ....................... 156/245 |
| 5,227,176 | A | * | 7/1993 | McIntyre-Major ........ 425/387.1 |
| 5,314,646 | A | * | 5/1994 | Strobel et al. ..................... 264/6 |
| 5,545,450 | A | | 8/1996 | Andersen et al. |
| 5,989,492 | A | * | 11/1999 | Larsson .......................... 419/36 |
| 6,537,483 | B1 | * | 3/2003 | Cartwright et al. ........... 264/511 |
| 6,576,089 | B1 | * | 6/2003 | Sato et al. ...................... 162/227 |
| 7,005,103 | B2 | * | 2/2006 | Smith et al. ................... 264/510 |
| 7,785,518 | B2 | * | 8/2010 | Wirt et al. ..................... 264/313 |
| 8,182,259 | B2 | * | 5/2012 | Kuntz et al. ................... 425/389 |
| 2004/0115303 | A1 | | 6/2004 | Burgess |
| 2005/0003195 | A1 | * | 1/2005 | Joseph et al. ................. 428/408 |
| 2005/0104248 | A1 | * | 5/2005 | Younie et al. ................. 264/219 |
| 2007/0063378 | A1 | * | 3/2007 | O'Donoghue ............... 264/219 |
| 2008/0105996 | A1 | * | 5/2008 | Kloeb et al. .................. 264/219 |
| 2009/0224427 | A1 | * | 9/2009 | Micarelli ...................... 264/319 |
| 2010/0143525 | A1 | * | 6/2010 | Kuntz et al. ................. 425/342.1 |
| 2011/0175262 | A1 | * | 7/2011 | Kiyomi et al. ................ 264/573 |
| 2012/0261853 | A1 | * | 10/2012 | Piedmont et al. ............. 264/101 |

* cited by examiner

*Primary Examiner* — Yogendra Gupta
*Assistant Examiner* — Emmanuel S Luk

(57) ABSTRACT

An adjustable support is used to support a preformed mold in a molding operation. The adjustable support includes an aggregate or particulate material that in a now stressed or reduced stress state is flowable to allow shaping thereof to effectively support a back face of the preformed mold. The adjustable support is then jammed to rigidify or fix the shape thereby effectively supporting the preformed mold. The adjustable support is changed from an adjustable state to a support state preferably by applying a vacuum pressure to the aggregate material. In the adjustable state an airflow can be introduced to the aggregate material to allow movement and/or displacement of the material.

7 Claims, 9 Drawing Sheets

ADJUSTABLE SUPPORT FOR PREFORMED MOLD

FIELD OF THE INVENTION

The present applications claims priority from U.S. Provisional Patent Application Ser. No. 61/740,832 filed on Dec. 21, 2012, incorporated herein by reference.

The present invention relates to molding apparatus and in particular to an adjustable support for preformed molds.

It is known to use lightweight preformed molds that require reinforcement or an adjustable support on a rear surface thereof for molding. These preformed molds are sometimes referred to as "skins" and provide certain known advantages and are cost effective in many applications.

Such preformed molds are typically made of a fiberglass, plastic or thin metal material and require reinforcement or effective support to avoid distortion of the mold during the injection molding process.

One adjustable support arrangement for such preformed molds is shown in U.S. Pat. No. 6,923,635. This patent discloses a frame support with a series of adjustable mechanical members that are movable to engage and provide support for the rear surface of the preformed mold. This arrangement works satisfactorily however it can be appreciated that mechanical adjustment of the support can be critical and requires a substantial setup time and skilled labour. Also this arrangement has higher point loads at the actuators that can contribute to mold distortion.

A different arrangement for supporting a preformed mold is disclosed in U.S. Pat. No. 7,785,518. In this patent a rigid steel retaining vessel is at least partially filled with a liquid material that supports a preformed mold thereabove. As can be appreciated the liquid supports the rear surface of the preformed mold and is non-compressible. The arrangement includes the ability to add, remove or otherwise displace the liquid material as required to accommodate the mold cavity.

Preformed molds and adjustable supports for the rear surface thereof are in contrast to steel or aluminum block type molds which have sufficient inherent strength. to withstand the injection molding pressures.

One important aspect with respect to the adjustable support for preformed molds is the maximum injection pressures that can be used as higher injection pressures reduce the actual mold filling time, reduce void content in the part and allow the product to be molded in a more cost effective precise manner.

The present invention provides an alternative to the known adjustable support arrangements for preformed molds.

SUMMARY OF THE INVENTION

A molding apparatus according to the present invention comprises a preformed mold having a molding face to one side thereof and a rear support face. An adjustable support comprises aggregate material contained in a retaining vessel where the aggregate material is positioned adjacent the rear support face. The aggregate material in an operating state supports the preformed mold during the molding operation and the adjustable support in a non-operating state is reconfigurable by displacement of the aggregate material. In the non-operating state the aggregate material is flowable such that the shape of the adjustable support can be altered. The molding apparatus further comprises an arrangement for selectively stressing the aggregate material to cause jamming of the aggregate material and thereby provide positive support of the rear surface of the preformed mold in the operating state. This arrangement for selectively stressing of the aggregate material can remove the stress from the aggregate material and allow the aggregate to move and change the shape of the adjustable support.

In a preferred aspect of the invention the aggregate material is maintained in a retaining vessel closed by a flexible sheet material on a side thereof adjacent the rear support face of the preformed mold.

In a further aspect of the invention the arrangement for selectively stressing the aggregate material includes a vacuum source within the retaining vessel for removing air and causing jamming of the aggregate material.

In a further aspect of the invention the vacuum source includes a plurality of ports within the retaining vessel and the ports are additionally connected to an air source for introducing air into the aggregate material to reverse jamming of the aggregate and allow flow of the aggregate.

In yet a further aspect of the invention the aggregate in the retaining vessel cooperates with reinforcing members that add tensile strength to the mold support when the aggregate is jammed.

In a further aspect of the invention the reinforcing members are provided exterior to the retaining vessel and the aggregate in the operating state generally envelops the reinforcing members whereby the reinforcing members provide additional strength for supporting the preformed mold. These reinforcing members can be provided exterior to the retaining vessel or they can also he provided within the retaining vessel.

In yet a further aspect of the invention the retaining vessel includes opposed flexible surfaces to opposite sides of the retaining vessel. These two opposed flexible surfaces allow for effective reshaping of the aggregate material to provide full support of the rear surface of the preformed mold.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
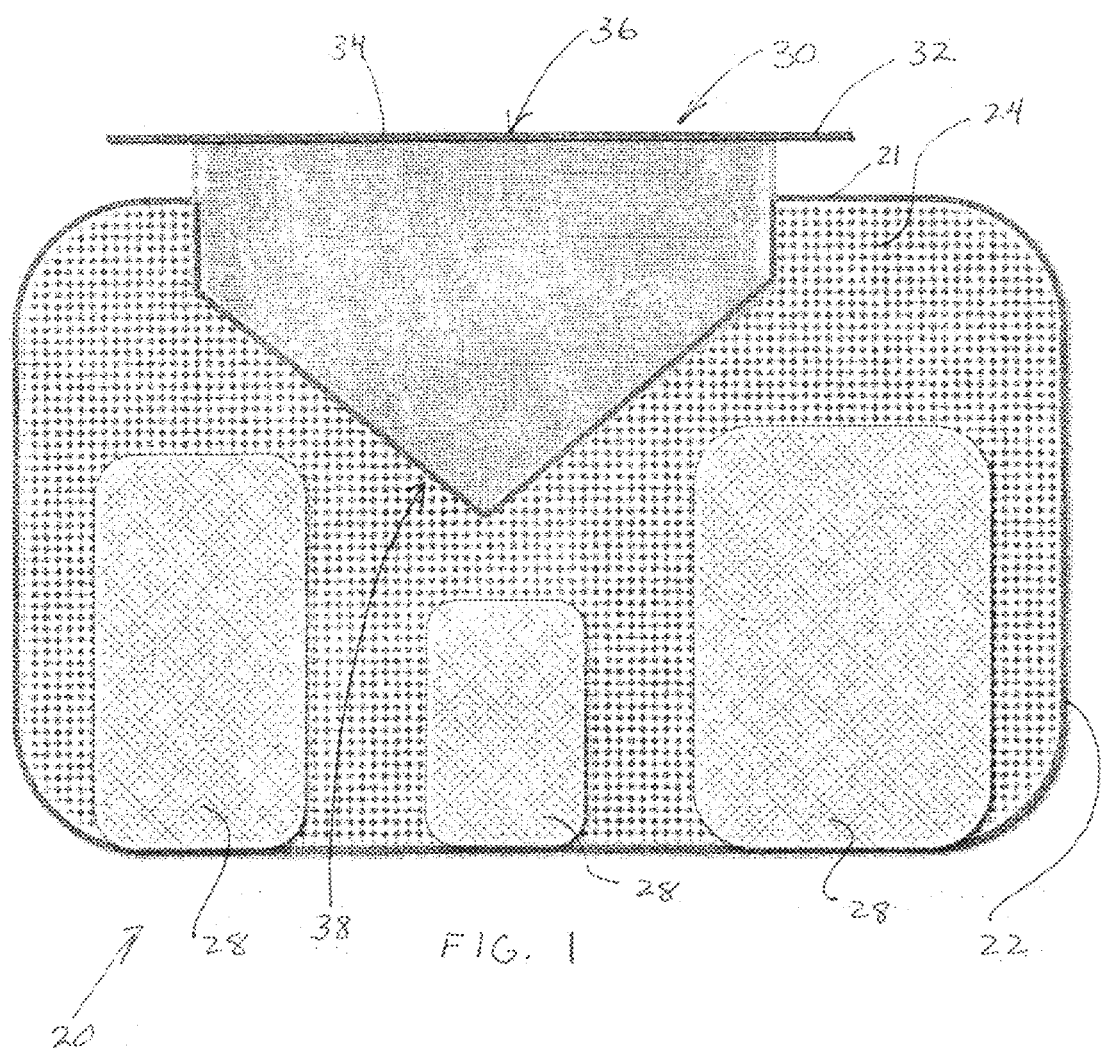
FIG. 1 is a schematic illustration of the adjustable support supporting a preformed mold.

The schematic of FIG. 1 illustrates the adjustable support 20 that is used to support the preformed mold 30. The adjustable support includes a flexible retaining vessel that houses the aggregate (jamming particulate) 24. The aggregate can include a wide range of different materials, however preferred materials include granular material having a size of 1 to 10 mm (preferably 2 mm) such as sand. The adjustable support 20 can include lighter weight fill structures illustrated as 28. As can be appreciated if the aggregate material is sand or other dense material, it may be desirable to include some lighter weight structural members within the retaining vessel 22 to reduce the overall weight of the adjustable support. These lighter weight structural materials may also assist in engaging the adjustable support for movement thereof and/or assisting in a shaping of the adjustable support during stressing thereof.

The term aggregate or particulate material is used herein to identify a large group of materials that are capable of being "jammed". The aggregate or particulate material can be selected to meet the support and processing requirements for use of the preformed mold or cost or other considerations.

Some representative examples of aggregate particulate materials are as follows:

silica sand, beach sand, marbles, ball bearings, shaped plastic particles, sand blasting particles such as metal beads of different sizes and shapes and materials, tumbling media such as washed river pebbles, glass beads, glass micro-spheres, crushed glass particles, propant particles (commonly used in the gas fracking area) of various sizes, shapes, angularity, roundness, hardness and surface roughness, walnut shell granules, aquarium sands, ceramic beads, plastic or ceramic coated sands, sand blasting particles of all kinds and hardnesses.

Small steel generally spherical particles are commonly available in a series of sizes. This material is commonly used in sand blasting applications. The availability of generally economical pricing structure renders it a desirable aggregate material for this application. Other metal spherical type materials such as copper or aluminum material is also desirable in applications where higher thermal conductivity is desired.

The adjustable support 20 includes a top surface 21 that is inwardly distorted. and/or displaced to receive the molding cavity 34 of the preformed mold 30. This preformed mold includes an outer perimeter flange 32, the mold cavity 34, a front face 36 and a rear face 38. The rear face 38 is pressed into the adjustable support 20 and the top surface 21 of the retaining vessel 22 is in contact with this rear face. The aggregate 24 is displaced by the insertion of the preformed mold and the aggregate effectively supports the rear face 38. With this arrangement the aggregate essentially conforms to the shape of the mold cavity and provides support for the preformed mold to withstand pressures encountered during the molding operation. The preformed mold on its own does not have sufficient structural rigidity to function without the additional support.

It is noted that the rear support provided by the adjustable support need not be completely uniform. The preformed mold can tolerate some inconsistencies such as a fold in the top surface 21 as this is not the mold finish surface but merely a support interface.

As can be appreciated the aggregate 24 can be of different materials with a relatively small particle size to allow for displacement thereof to receive the rear surface of the preformed mold. The aggregate material 24 is also capable of being stressed to cause jamming of the aggregate. Stressing of the aggregate typically includes compaction, vibration and then jamming. This reduces the amount of distortion of the adjustable support. The displacement of the particles to allow engagement and support of the preformed mold can be facilitated or improved by introducing air to partially fluidize the particles.

Figure 2:
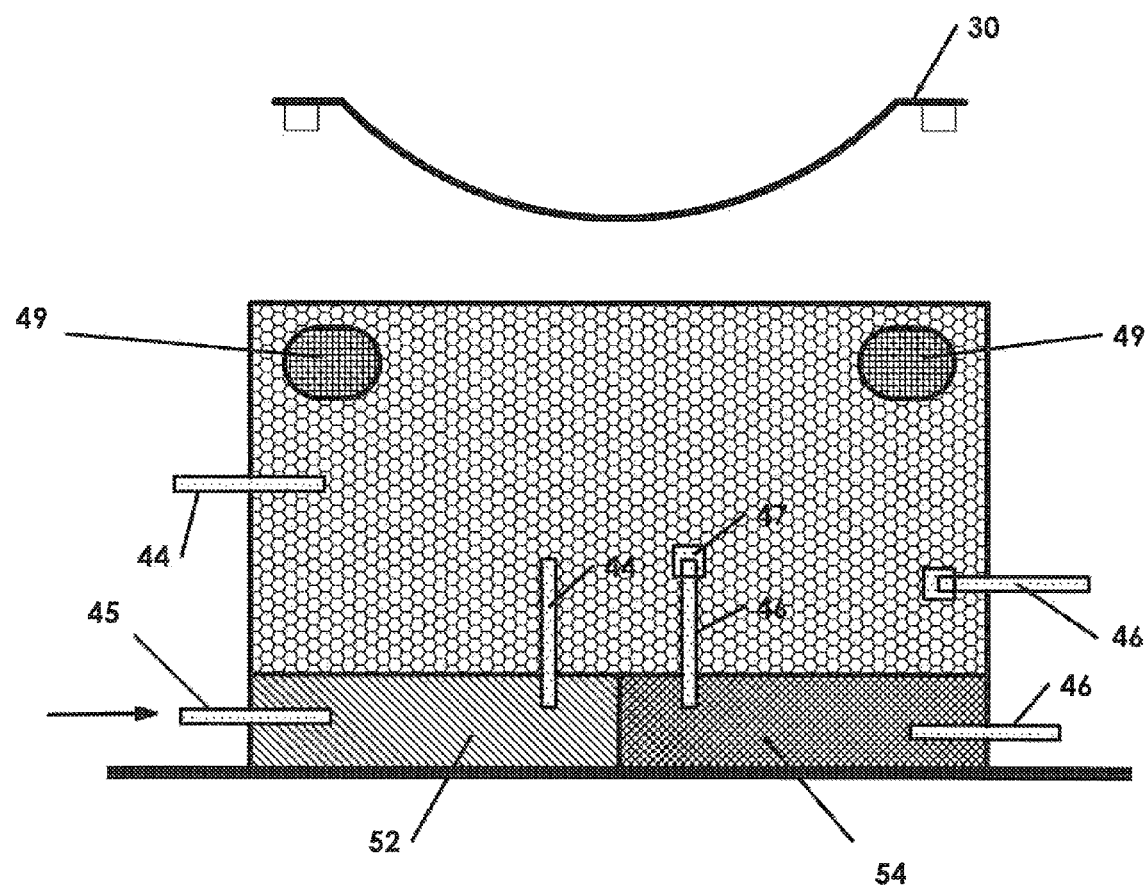
FIG. 2 is a schematic illustration of the adjustable support illustrating aggregate provided in a flexible container in combination with a suitable arrangement for stressing the aggregate.

FIG. 2 illustrates the dual function base 50 that includes the vacuum chamber 54 and the pressure chamber 52. The vacuum chamber via the vacuum nozzles 46 selectively applies a vacuum force to the aggregate drawing air out of the retaining vessel, compacting and stressing the aggregate sufficiently to cause jamming thereof. With this arrangement the aggregate material effectively solidifies and provides positive support of the rear face of the preformed mold 30. As can be appreciated there is distortion or compaction of the retaining vessel 22 during jamming as air is being removed and the retaining vessel is reduced in volume. The distortion of the retaining vessel is controlled to maintain support engagement of the preformed mold. Different arrangements can be provided to stress the aggregate and provide positive support across the rear face of the flexible mold. A number of these different arrangements are shown in the subsequent drawings.

It is also possible to initially turn the preformed mold upside down and then place the adjustable support on top of the preformed mold in contact with the rear face of the mold. With this arrangement, gravity assists in deforming the adjustable support to comply with the rear surface of the mold. Air is subsequently withdrawn to stress and jam the aggregate. Once jammed the orientation of the combination is reversed. With this arrangement gravity assists in the shaping and subsequent jamming of the adjustable support. Some shaping of the top surface of the adjustable support is normally provided as this surface will become the bottom surface when the preformed mold is inverted.

One advantage of the present system is the ability of the adjustable support 20 to return to a non-stressed state of the aggregate and allow effective flow or displacement of the aggregate. This conversion in state of the aggregate can occur by releasing or partial release of the vacuum force on the retaining vessel to reduce shear stress necessary for jamming, however this conversion can further be assisted by the introduction of positive air pressure or air flow into the retaining vessel. As shown in FIG. 2, the positive air pressure chamber 52 when activated provides distributed air through the nozzles shown as 44 to alter the state of the aggregate. A source of air pressure can be connected to pressure chamber 52 through inlet 45. An airflow exhaust port 49 for the retaining vessel accommodates a pressurized airflow through the retaining vessel.

Tuning of the mold support is possible by reducing the stressing force, typically the vacuum pressure. it is possible to soften a top layer of the aggregate to provide better support to a mold skin (preferred mold) and then stressing to solidify the aggregate. Therefore control of the jamming stress allows an operator to tune or adjust the aggregate prior to full jamming thereof. This can he helpful in providing effective support of the rear surface of the preformed mold. Later drawings (FIG. 9) show a horizontally split adjustable support where upper and lower supports are provided in combination.

The upper mold unit 150 includes clamping arms 152 that engage the underside of collar 98 when the mold unit 150 is appropriately positioned above the lower mold unit for molding. Preferably the upper mold unit 150 includes seal members 156.

With the release of the vacuum condition causing jamming of the aggregate, the aggregate becomes displaceable and the same adjustable support can be used for supporting different preformed molds and assists in releasing a supported preformed mold. The ability to quickly convert from a jammed or operating state supporting the rear surface of the preformed mold to a flexible state where the aggregate is displaceable, is advantageous when the adjustable support is used in an automated process. In an automated process, a preformed lower mold is brought into engagement with an adjustable support.

Figure 4:
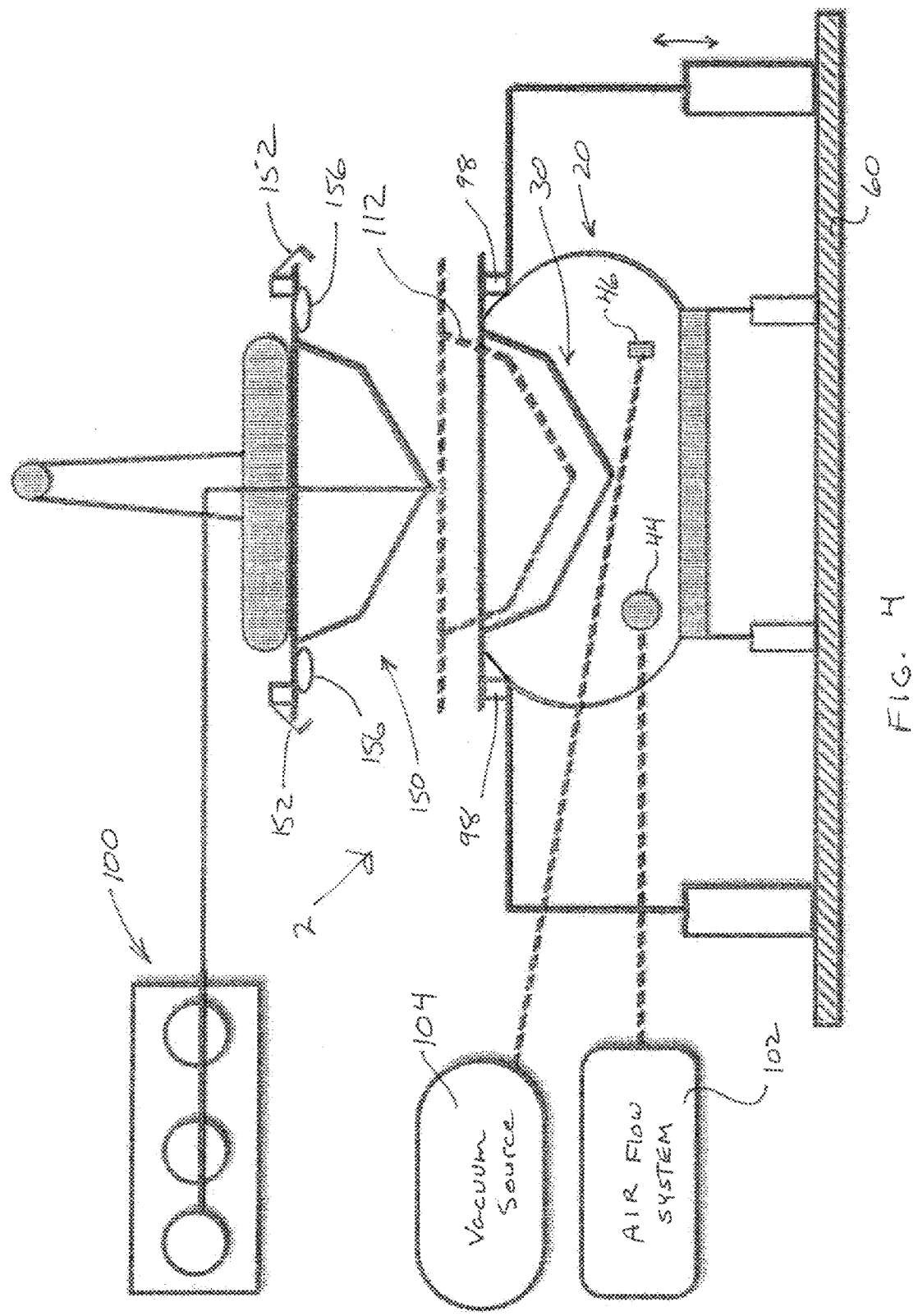
FIG. 4 is a schematic illustration of a RFM molding operation.
Figure 5:
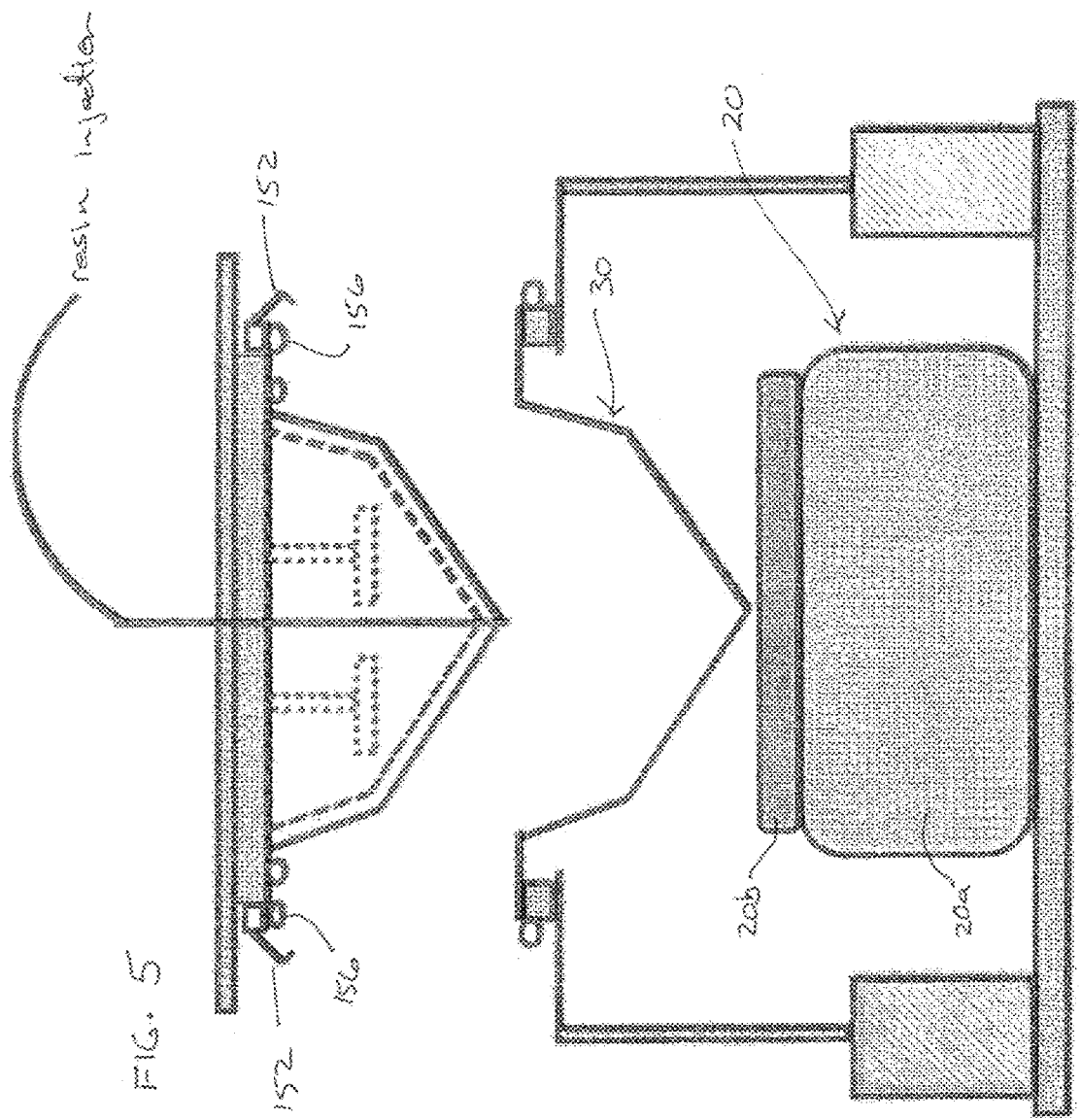
FIG. 5 is a schematic view similar to FIG. 4.
Figure 6:
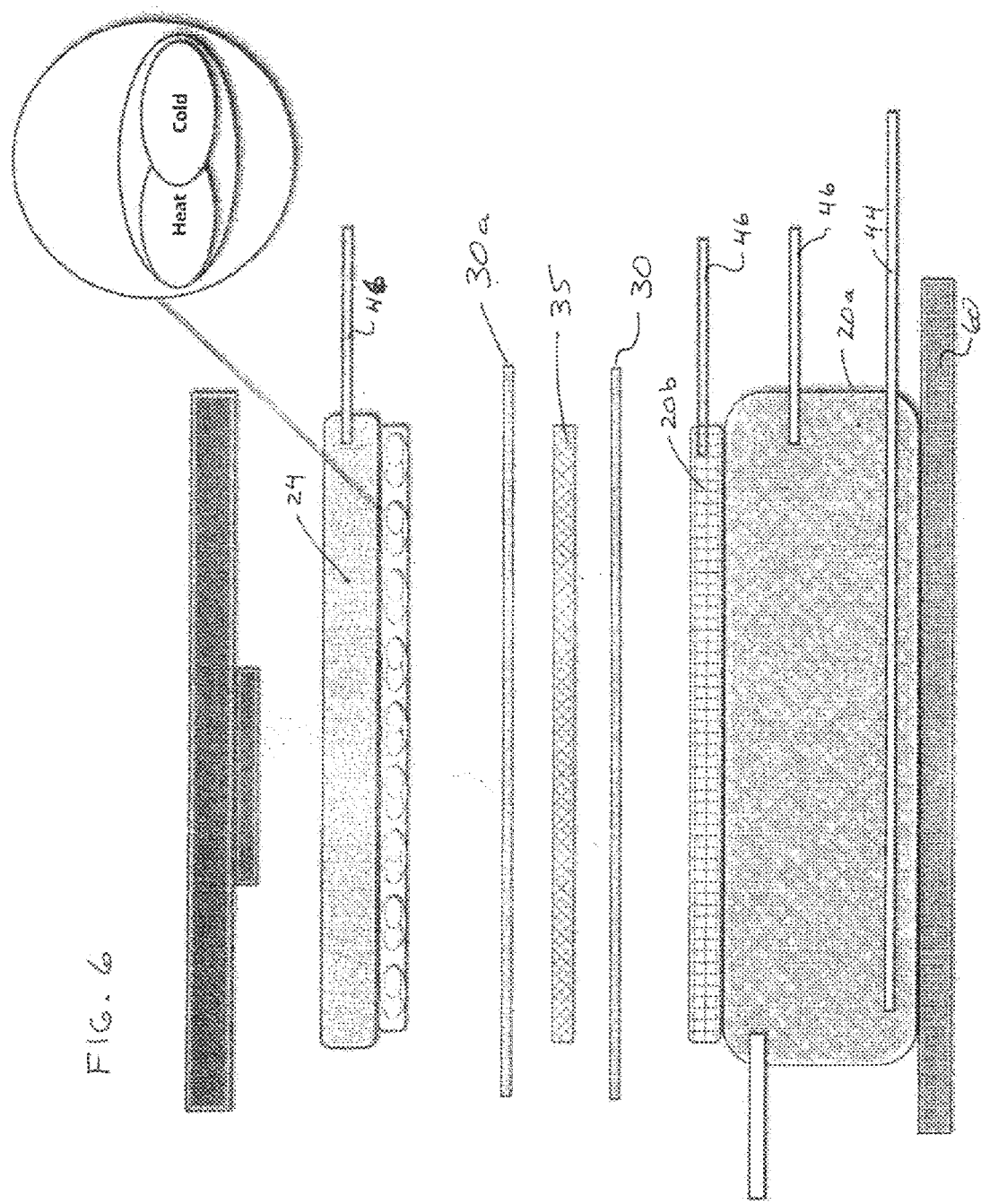
FIG. 6 is a schematic view showing a lower mold skin and an upper mold skirt appropriately supported and the various molding layers provided therebetween.

The supported lower preformed mold is then positioned relative to an upper preformed mold to define a mold cavity suitable for subsequent injection molding. It is then possible to separate the preformed molds and separate the lower preformed mold from the adjustable support. This lower preformed mold may then be moved offline to allow the product to fully set or cure. These aspects are shown in FIGS. 4 through 6. This type of process is helpful to reduce the number of adjustable supports as the preformed molds have sufficient strength and support to accommodate the final curing of the product. The adjustable support is then activated to support a subsequent preformed mold. With this arrangement the time to mold products is less dependent on the curing or setting time. Depending on the shape of the preformed molds they may be removable from the adjustable support without release or full release of the adjustable support from the jammed state.

In FIG. 2, the vacuum nozzles are provided to one side of the adjustable support and the air injection nozzles 44 are provided to the opposite side of the adjustable support. This is merely for the purpose of illustration. These nozzles can directly connect with the appropriate vacuum chamber or positive air pressure chamber or the nozzles can be connected to these chambers or other appropriate sources via feed tubes. In most cases these nozzles will be appropriately distributed throughout the adjustable support and typically in the middle to lower portion of the support to allow for the receipt of the preformed mold in an upper region of the retaining vessel. In addition, in FIG. 2a an air filter arrangement 47 is shown associated with the vacuum nozzle 46. The vacuum source is applied to the aggregate material through these nozzles and the nozzles are designed such that the aggregate will not pass into the nozzles.

Figure 3:
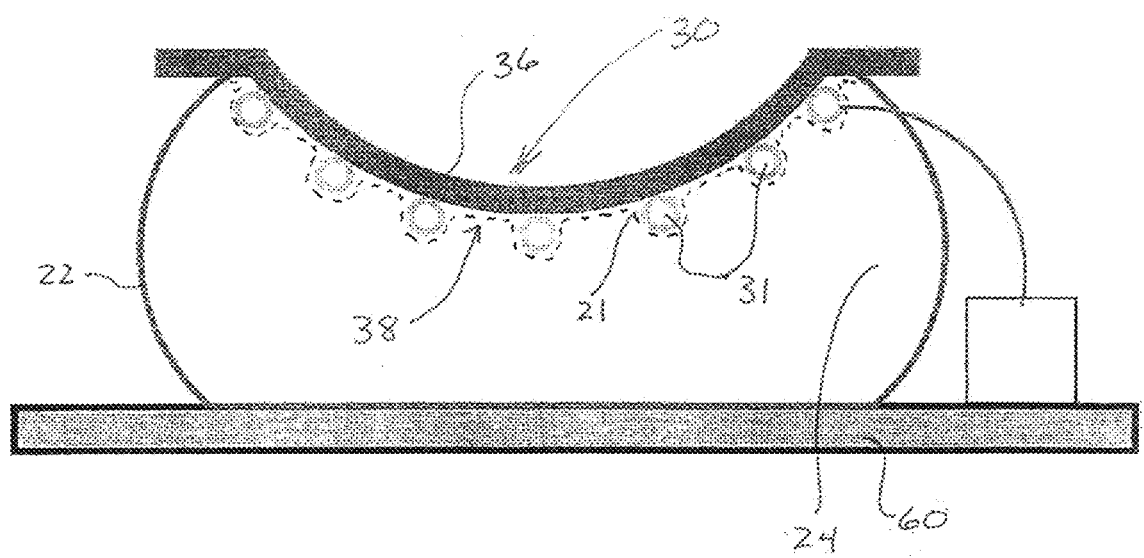
FIG. 3 is a schematic illustrating a preferred embodiment where the flexible mold includes additional conduits for use in maintaining certain, molding conditions.

In FIG. 3 a schematic is shown where the preformed mold 30 includes a series of heating ducts 31 provided on a bottom surface of the preformed mold or otherwise associated therewith. As can be appreciated when this preformed mold with the conduit 31 is pressed into the top surface of the adjustable support 20, the adjustable support will conform to the shape of the rear surface 38 and generally envelop the conduits 31 below a lower surface of the preformed mold. The conduits 31 are desirable for assisting in appropriate heating of the mold and/or cooling of the mold as may be required according to the particular molding application. The heating ducts or tubes 31 accommodate an air or other fluid flow adjacent the preformed mold and can be used to add heat to the preformed mold and/or remove heat therefrom.

It is also possible to add or remove heat from the preformed mold by including a flexible sheet having an electrical circuit associated therewith for adding or removing heat. For example the flexible sheet can have a carbon based circuit typically printed thereon that when activated can add heat.

Therefore a layer or structure under the preformed mold (i.e. associated with the rear surface) can be provided to add or remove heat. Furthermore the preformed mold itself can have this type of structure formed as part of the preformed mold. The ability to add or remove heat can be advantageous with respect to the use of the system and in particular the curing/setting times of molded product. In some circumstances an epoxy layer is used to secure conducting wires or conduits to the rear surface of a preformed mold (mold skin).

FIG. 3 also shows the base 60 for supporting of the retaining vessel 20. In most cases the retaining vessel 20 includes a bag-like container and it is preferably associated with a rigid base 60. This base assists in any movement of the adjustable support and/or storage of the support. The base can also include side structures to assist in maintaining or partially defining side portions of the bag like container.

The top surface member of the retaining vessel which is or becomes an integral part of the retaining vessel by attachment through various means, is preferably a relatively thin, flexible sheet material. In some applications of the adjustable support heat is added and in this case the top surface member may include one or more layers of similar or dissimilar materials. These layers of material act as one unit to provide a sealable function to the retaining vessel and elastic or stretchable function which allows conformance to the preformed mold.

The top surface member can be attached to the retaining vessel by sewing or mechanical means and may in some cases have reinforcement elements such as welts or grommets to assist in attaching or fastening the top surface member to the balance of the retaining vessel. The materials used to make the top surface member can be silicone rubber, latex, EVA (ethylene vinyl acetate), or EVA/polyethylene blends, rubber, polyurethanes, polyurethane coated fabrics having elongated weaves, PVC blends with or without scrim fibers or the like. The preferred materials are polyurethane coated polyester fabrics and or silicone rubber blends such as those sold by Torr Inc.

The retaining vessel will in most cases be sealable with or without gasket seals or other sealable means. In other cases the retaining vessel may not be totally sealable but will hold a level of vacuum that when it appropriately stresses the granular media, jamming of the media will occur.

FIGS. 4 through 6 show different aspects of the adjustable support for use in a resin transfer molding application (RTM). In the schematic of FIG. 4 it can be seen that a female preformed mold is used in association with a male preformed mold with each of these molds being supported by the adjustable support arrangement. The molds cooperate with each other to define an injection cavity therebetween and an injection material may be injected between the two preformed molds. FIG. 4 shows the mold parts partially separated to allow the mold part 112 to be removed. Various support arrangements can be provided for supporting of the adjustable supports and movement of the molds to effect removal of the part. FIG. 4 shows resin injection pumps and tanks 100 associated with the molding apparatus 2 as well as the air system. 102 for adding air to the aggregate material and the vacuum generator 104 for removing air and effectively stressing the aggregate material to cause jamming thereof.

The RTM process includes at least the following steps:
 a) smooth the mold face of the preformed, molds:
 b) apply a release agent to the mold faces;
 c) apply a gel coat finish layer;
 d) apply fiber or other reinforcement in the mold cavity;
 e) close mold and inject fill material under pressure; and
 f) optionally remove preformed mold from adjustable support and cure off line.

The optional step f) is particularly advantageous with the present system as the preformed mold provides sufficient support for curing, is relatively light in weight and many times less expensive than a steel mold. If offline curing is used a series of preformed molds are required.

The present arrangement can be used in an infusion "light" Resin Transfer Molding application using a vacuum force (approximately 15 psi) to transfer resin. The process is considered "light" due to the low pressures. This arrangement can also be used in traditional RTM processes where injection pressures of 100 to 125 psi are common. Even higher injection pressures up to about 300 psi can be used with cost effective mold presses.

In FIG. 5 it can be seen that the adjustable support medium 20 now includes a bottom adjustable support 20a and an associated upper adjustable support 20b. It has been found desirable to break the adjustable support into two independent layers although they do cooperate in a similar manner to effectively receive and support the rear face of the preformed mold. Preferably the contact surfaces of the two adjustable supports are textured to promote engagement therebetween. A patterned dimpled surface can be used.

Figure 7:
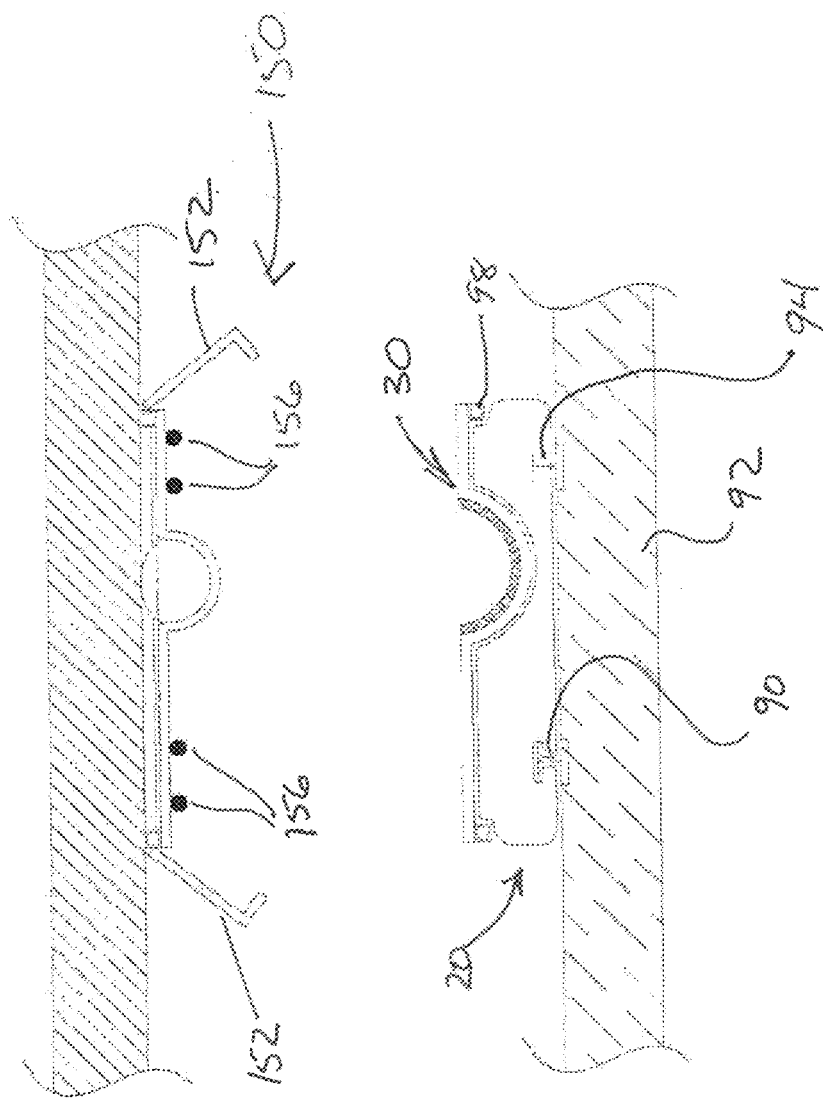
FIG. 7 illustrates a variation of the system for molding of product.

As shown in FIGS. 5 through 7, the adjustable support can also be used for effectively supporting the back surface of the cavity of the male preformed mold. This may require inverting the male preformed mold and inserting on the adjustable to avoid weight distortion issues. The adjustable support can then be jammed and the combination inverted for use. Other assembly procedures can be used.

In FIG. 6 the molding apparatus 2 is shown with an upper preformed mold 30a and the lower preformed mold 30 as well as reinforcement and cores 35 that are being molded with the mold part.

The adjustable support 20 has been described with respect to the use of aggregate or jamming particulate material where the material can effectively be stressed and jammed by applying a vacuum source thereto. This process can be enhanced by adding vibration apparatus and the vibration apparatus may also be of assistance in the molding process and/or to assist in transfer from the jammed state to the displaceable or adjustable state. It is therefore appreciated that the adjustable support can be effectively used with preformed molds in different applications and is not restricted to a stationary molding application. It can also be appreciated from FIG. 6 that desirable heating and cooling can be applied to the molding apparatus to improve the manufacturing process. These preformed molds can be used to produce a host of products including boat hulls, automotive components, other vehicle applications as well as non-vehicle consumer and industrial products.

Figure 9:
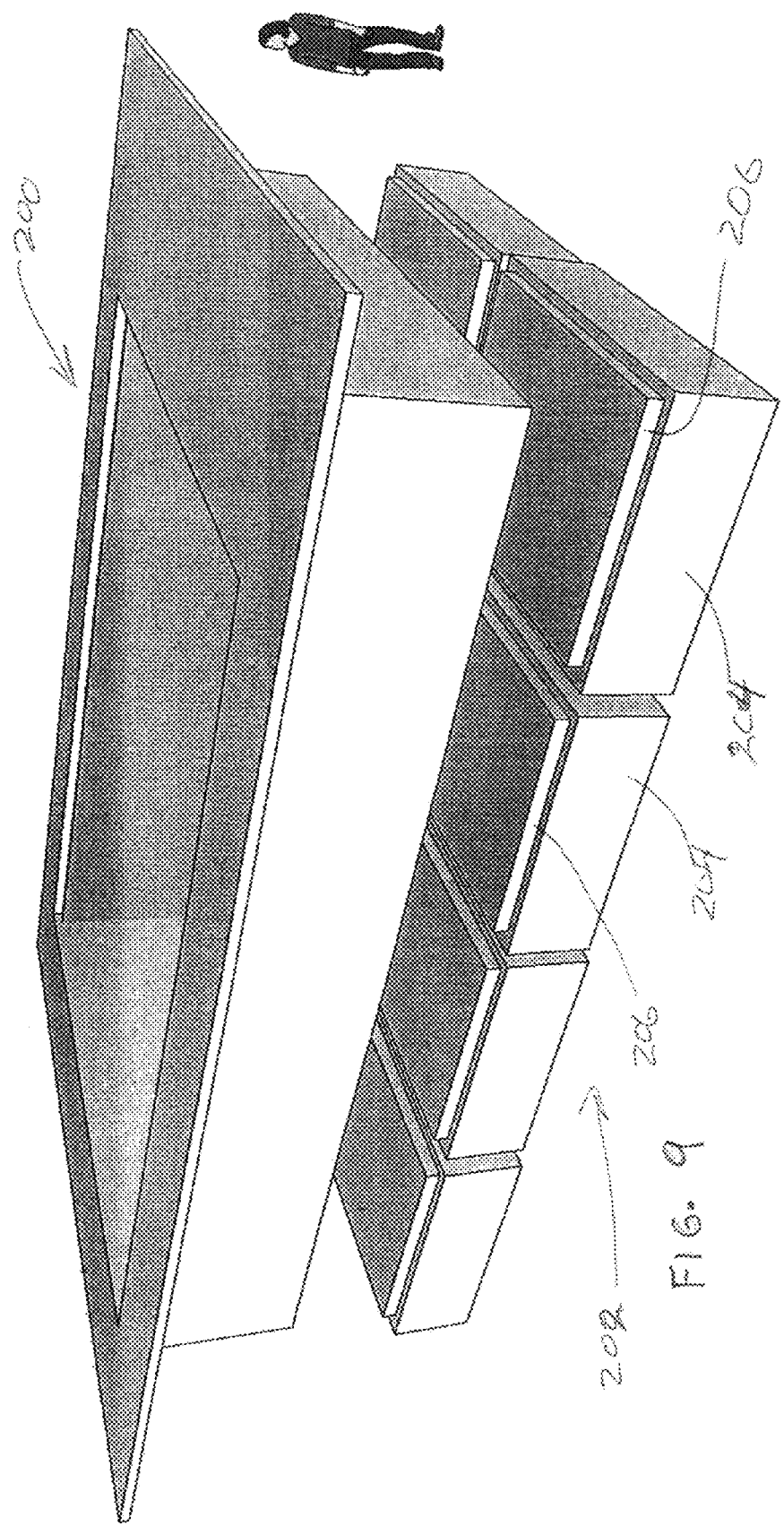
FIG. 9 illustrates a series of adjustable supports.

It is possible to mold very large parts such as long turbine blades of wind turbines as one example. Other large molded parts include lap type swimming pools. FIG. 9 schematically illustrates a very large preformed mold 200 supported by a series of adjustable supports 202. Each of these adjustable supports includes a base support 204 and a smaller upper support 206. Such a series of adjustable supports is preferred in molding long and/or large molded parts.

If the adjustable support is divided into different stacked supports a gripping layer or member may be inserted therebetween. Each adjustable support when jammed will grip any extending members and lock the supports together when jammed. Such a gripping layer could be members attached to floor in contrast to between supports.

A further variation of the adjustable support is one or more adjustable band members to maintain a desired shape and to provide some limited stressing of the aggregate. Horizontal adjustable bands have been used about the adjustable support to enhance or encourage vertical compaction and limit horizontal compaction or spread of the adjustable support during jamming. Such lateral shifting or spread may occur in the final stages of jamming the particles.

A further variation is using pretensioned members with the aggregate that is jammed around the members. These members could also be precompressed members.

FIG. 7 illustrates the adjustable support 20 engaging an external anchor 90 that is part of a rigid support 92 as well as an internal anchor 94 that projects out of the adjustable support 20 and engages the rigid support. The bottom flange 96 of the internal support is received in an appropriate recess or track in the rigid support 92. The preformed mold 30 has a lower collar support 98 that is also supported and partially engaged by the adjustable support 20.

Figure 8:
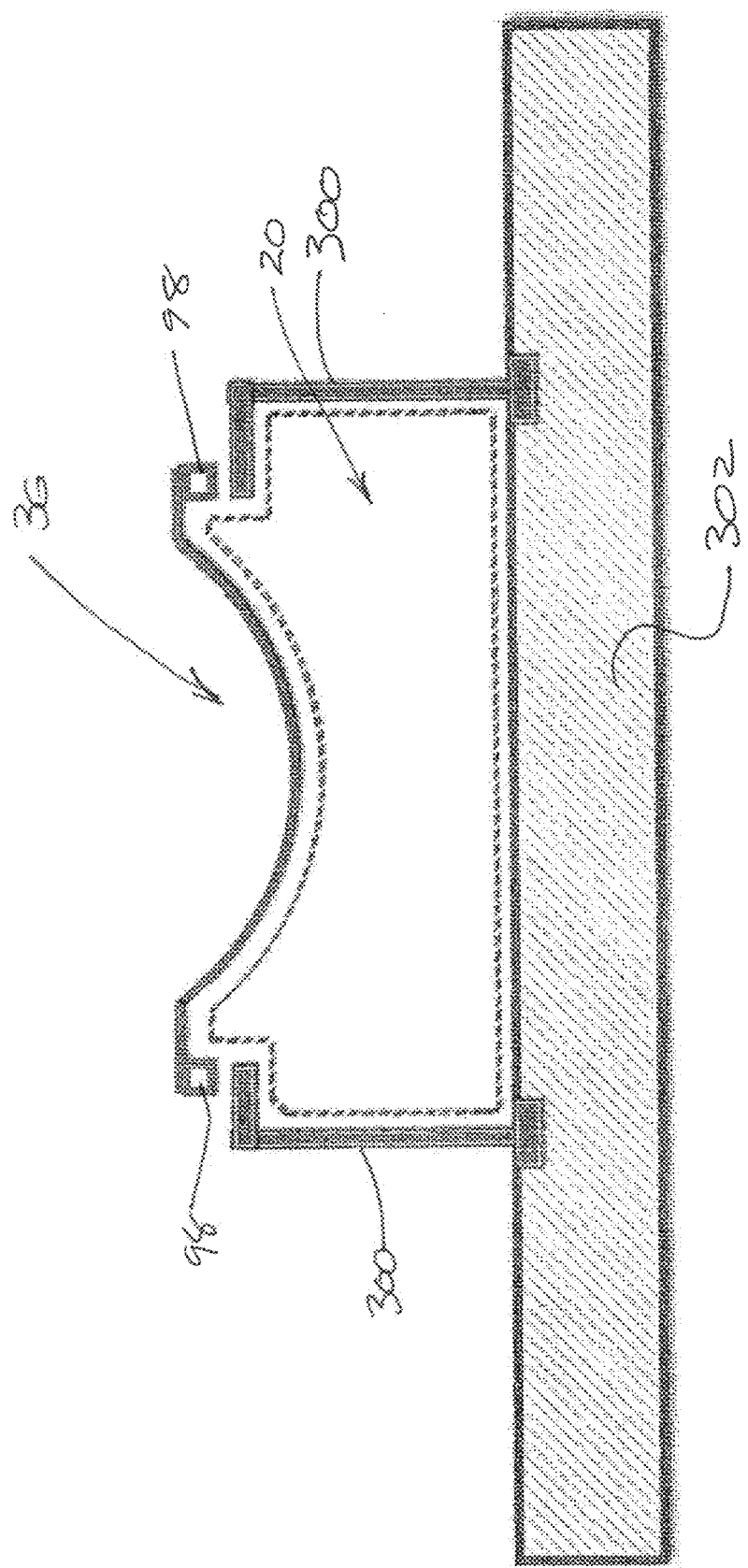
FIG. 8 illustrates a variation for supporting the adjustable support.

FIG. 8 illustrates a further variation where inverted "L" shaped restrains 300 are fixed in a rigid support 302 and the adjustable support 20 is received between the "L" shaped constraints. In this embodiment the mold collar 98 is supported on the upper flange of the inverted "L" shaped restraints. This arrangement restricts outward pancaking of the adjustable support prior to jamming. Some outward displacement may be allowed to accommodate displacement of the adjustable support.

The use of the adjustable support and the aggregate thereof can provide generally uniform support of the rear surface of the preformed mold. Although this uniform support is desirable it may not always be necessary. A host of point support of the rear surface of the preformed mold is often sufficient. Such point support is typical of larger size aggregate or particulate material. A wide variety of aggregate materials can be used assuming that accommodate the displacement in the adjustable state and allowing jamming in the support state. Jamming is sometimes referred to in the literature as caused by Isotropic Shear Stress that allows the particles to temporarily lock together and act as a rigid or solid structure. This functionality is advantageously used for supporting one or more preformed molds.

Although the adjustable support can support a preformed mold adequately by itself during processing, there are times when it is beneficial to use a combination of adjustable supports and other support elements such as actuators and reinforcing plates or components to assist in indexing the position of sections of a preformed mold while also reinforcing the areas between such additional supports and positioners. The use of adjustable or mechanical supports etc. can provide more consistency in supporting critical areas of the preformed mold. This may be desirable to overcome a location prone to variation or a location where more precision may be required. Therefore the present support system can be used with other support systems in either a primary support role or a secondary support role.

Different sensor can be used in combination with the adjustable support system. These sensors and other elements such as heaters and gratings can be placed in, on, or under the retaining vessel.

As previously disclosed, air flows introduced into the retaining vessel can be of any temperature that can be tolerated by the materials of which the retaining vessel and top surface are fabricated or constructed, and the materials being processed. These air flows are balanced with exhaust vents and vacuum ports, so that the unjammed retaining vessel and the jammed vessel before and during processing respectively can conform to the preformed molds and also support the preformed molds adequately so that the processing of the parts is efficient and effective. The beneficial aspect ratio of the particles, and the related significant combined surface area of all the particles improves the heat transfer process, as parts are heated to improve cure time or cool molds in preparation for subsequent molding cycles.

Although preferred embodiments of the invention have been described herein, it would be understood by those of skill in the art that variations may be made thereto without departing from the invention as described herein.

The Embodiments of The Invention In Which An Exclusive Property Or Privilege is Claimed are Defined as Follows:

1. A molding apparatus comprising
   a preformed first mold having a molding face to one side thereof and a rear support face;

a preformed second mold having a molding face to one side thereof and a rear support face;

an adjustable support comprising aggregate material retained in a retaining vessel, a flexible sheet material covering said aggregate material, an arrangement for fluidizing said aggregate material and an arrangement for stressing said aggregate material;

said adjustable support in a stressed state of said aggregate material having said flexible sheet material and stressed aggregate material shaped to generally uniformly support said rear support face of said first preformed mold for an injection molding operation;

said adjustable support when said arrangement for fluidizing said aggregate material is activated being reconfigurable as the aggregate material is displaceable such that the shape of the adjustable support can be altered to follow the shape of the rear support face of said first preformed mold;

a support for said preformed second mold supporting said second preformed mold with said molding face thereof is opposite said molding face of said preformed first mold and movable to bring said preformed molds into abutment defining an injection molding cavity between said molding faces; sealing means about said injection molding cavity; and an arrangement for injecting plastic under pressure into said molding cavity; and wherein said arrangement for stressing said aggregate material causes jamming of said aggregate material and support of said rear support face of said first preformed mold and said arrangement for fluidizing said aggregate material allows for reconfiguration of said aggregate material.

2. A molding apparatus as claimed in claim 1wherein said arrangement for stressing said aggregate material includes a vacuum source located within said retaining vessel removing air and causing jamming of said aggregate material.

3. A molding apparatus as claimed in claim 2 wherein said vacuum source includes a plurality of ports positioned within said aggregate material and said ports are additionally connected to an air source of said arrangement for fluidizing said aggregate material, said air source introducing air into said aggregate material to reverse jamming of said aggregate and to assist in displacement of said aggregate material for supporting the rear support surface.

4. A molding apparatus as claimed in claim 1 wherein said aggregate material cooperates with reinforcing members positioned in said aggregate material to add tensile strength to the mold support when said aggregate material is jammed.

5. A molding apparatus as claimed in claim 1 wherein said adjustable support includes a bag like container holding said aggregate material therein, and said reinforcing members provided exterior to the adjustable support and said aggregate material and said adjustable support partially envelope and engage the reinforcing members.

6. A molding apparatus as claimed in claim 1 wherein said adjustable support includes a bag like container integrated with said flexible sheet to collectively retain said aggregate material therein.

7. A molding apparatus comprising:

a preformed mold having molding face to one side thereof and a rear support face;

an adjustable support comprising aggregate material contained in a retaining vessel positioned adjacent said rear support face and that in an operating state supports said preformed mold during a molding operation;

said adjustable support in a non operating state being reconfigurable as the aggregate material is flowable such that the shape of the adjustable support can be altered;

said adjustable support including a base and one or more rigid supports extending upwardly within said aggregate material and below an upper surface of said aggregate material defined by a flexible sheet material positioned to be intermediate said aggregate material and the rear support face during a molding operation; and wherein said adjustable support further comprises an arrangement for selectively stressing said aggregate material to cause jamming of said aggregate material in said operating state and providing support of said rear support face and in said non-operating state allowing said aggregate material to move and change the shape thereof behind said rear support face.

\* \* \* \* \*